US012782003B2

(12) United States Patent
Iijima

(10) Patent No.: US 12,782,003 B2
(45) Date of Patent: Nov. 3, 2026

(54) TANK AND WATER HEATER

(71) Applicant: Mitsubishi Electric Corporation, Tokyo (JP)

(72) Inventor: Shigeru Iijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 401 days.

(21) Appl. No.: 18/696,112

(22) PCT Filed: Jan. 17, 2022

(86) PCT No.: PCT/JP2022/001276
§ 371 (c)(1),
(2) Date: Mar. 27, 2024

(87) PCT Pub. No.: WO2023/135777
PCT Pub. Date: Jul. 20, 2023

(65) Prior Publication Data

US 2024/0393015 A1 Nov. 28, 2024

(51) Int. Cl.
*F24H 9/45* (2022.01)
*C02F 1/00* (2023.01)
(Continued)

(52) U.S. Cl.
CPC ............ *F24H 9/455* (2022.01); *C02F 1/001* (2013.01); *C02F 1/004* (2013.01); *C02F 1/44* (2013.01);
(Continued)

(58) Field of Classification Search
CPC . F24H 9/146; F24H 9/455; F24H 9/40; F24H 1/181; F24H 1/38; F24H 1/54;
(Continued)

(56) References Cited

U.S. PATENT DOCUMENTS 3,960,508 A * 6/1976 Bessant .................. B01J 8/0278 55/529
7,393,510 B2 * 7/2008 Glover ................... B01D 39/06 526/71
(Continued)

FOREIGN PATENT DOCUMENTS

EP 2796806 A1 10/2014
JP 2011-117667 A 6/2011
(Continued)

OTHER PUBLICATIONS

JP 2012207846 A—Translation (Year: 2012).*
(Continued)

*Primary Examiner* — Helena Kosanovic
*Assistant Examiner* — Benjamin W Johnson
(74) *Attorney, Agent, or Firm* — Posz Law Group, PLC

(57) ABSTRACT

A tank according to an embodiment of the present disclosure includes: a tank main body that is disposed along a center axis, and that stores a liquid on an inside thereof; an inflow pipe having an inflow opening that opens to the inside of the tank main body; an outflow pipe having an outflow opening that opens to the inside of the tank main body, and a trapping material that is located on the inside of the tank main body, wherein the trapping material is separately disposed from the inflow opening and the outflow opening, and is provided on a part of the inside of the tank main body in a cross-section that includes the trapping material so as to be orthogonal to an axial direction of the center axis.

12 Claims, 10 Drawing Sheets

(51) Int. Cl.

| | |
|---|---|
| *C02F 1/44* | (2023.01) |
| *F24H 1/18* | (2022.01) |
| *F24H 1/38* | (2022.01) |
| *F24H 1/54* | (2022.01) |
| *F24H 9/14* | (2006.01) |
| *F24H 9/40* | (2022.01) |

(52) U.S. Cl.
CPC .............. *C02F 1/444* (2013.01); *F24H 1/181* (2013.01); *F24H 1/38* (2013.01); *F24H 1/54* (2022.01); *F24H 9/146* (2013.01); *F24H 9/40* (2022.01)

(58) Field of Classification Search
CPC .. C02F 1/001; C02F 1/004; C02F 1/44; C02F 1/444
USPC .......................................................... 126/344
See application file for complete search history.

(56) References Cited

U.S. PATENT DOCUMENTS

| | | | | |
|---|---|---|---|---|
| 10,500,581 | B1 * | 12/2019 | Glover .................. | B01D 3/009 |
| 2005/0029204 | A1 * | 2/2005 | Schwartzkopf .... | B01D 21/0012 210/793 |
| 2017/0067654 | A1 | 3/2017 | Kawashima et al. | |

FOREIGN PATENT DOCUMENTS

| | | | |
|---|---|---|---|
| JP | 2012207846 | A * | 10/2012 |
| JP | 2014-018739 | A | 2/2014 |
| JP | 2016-211798 | A | 12/2016 |
| JP | 2020-128825 | A | 8/2020 |
| WO | 2013/094410 | A1 | 6/2013 |
| WO | 2015/132984 | A1 | 9/2015 |

OTHER PUBLICATIONS

International Search Report of the International Searching Authority mailed Mar. 22, 2022 in corresponding International Application No. PCT/JP2022/001276 (and English translation).

* cited by examiner

TANK AND WATER HEATER

CROSS-REFERENCE TO RELATED APPLICATION

This application is a U.S. National Stage Application of International Application No. PCT/JP2022/001276 filed Jan. 17, 2022, the contents of which are incorporated herein by reference.

TECHNICAL FIELD

The present disclosure relates to a tank and a water heater.

BACKGROUND

For example, as shown in Patent Document 1, a water heater device that includes a scale trap to capture scale that has precipitated due to hard components dissolved in the water is known. In such a water heater device, it is possible to capture scale included in the water by passing the water through the scale trap.

PATENT DOCUMENT

[Patent Document 1] Japanese Unexamined Application No. 2012-207846, First Publication In a water heater device such as the previously mentioned device of Patent Document 1, the more scale is trapped by a scale trap, the more difficult it becomes for water to pass through the scale trap. Accordingly, the scale trap becomes a resistance in a flow path within the water heater device, and a problem of pressure loss occurring due to water flowing to an inside of the water heater device exists.

SUMMARY

The present disclosure has been made in order to address the problem above, and an object is to provide a tank that suppresses pressure loss of a liquid stored inside a tank main body from becoming large when the liquid flows, and a water heater that includes such aforementioned tank.

A tank according to an embodiment of the present disclosure includes: a tank main body that is disposed along a center axis, and that stores a liquid on an inside thereof; an inflow pipe having an inflow opening that opens to the inside of the tank main body; an outflow pipe having an outflow opening that opens to the inside of the tank main body, a trapping material that is located on the inside of the tank main body, and a plurality of trapping materials that includes the trapping material are disposed side by side in one direction, and a support member that is fixed to the tank main body, wherein the support member has a support member main body that is disposed on the inside of the tank main body, the plurality of trapping materials are separately disposed from the inflow opening and the outflow opening, and are provided on a part of the inside of the tank main body in a cross-section that includes the trapping material so as to be orthogonal to an axial direction of the center axis, the plurality of trapping materials are attached to the support member main body, and the support member main body extends in said one direction, and penetrates the plurality of trapping materials.

A water heater according to an embodiment of the present disclosure includes: tank, a heat exchanger connected to the tank, and an outdoor unit that is connected to the heat exchanger.

According to the present disclosure, it is possible to suppress a pressure loss of a liquid stored inside a tank main body from becoming larger when the liquid flows.

DETAILED DESCRIPTION

Figure 1:
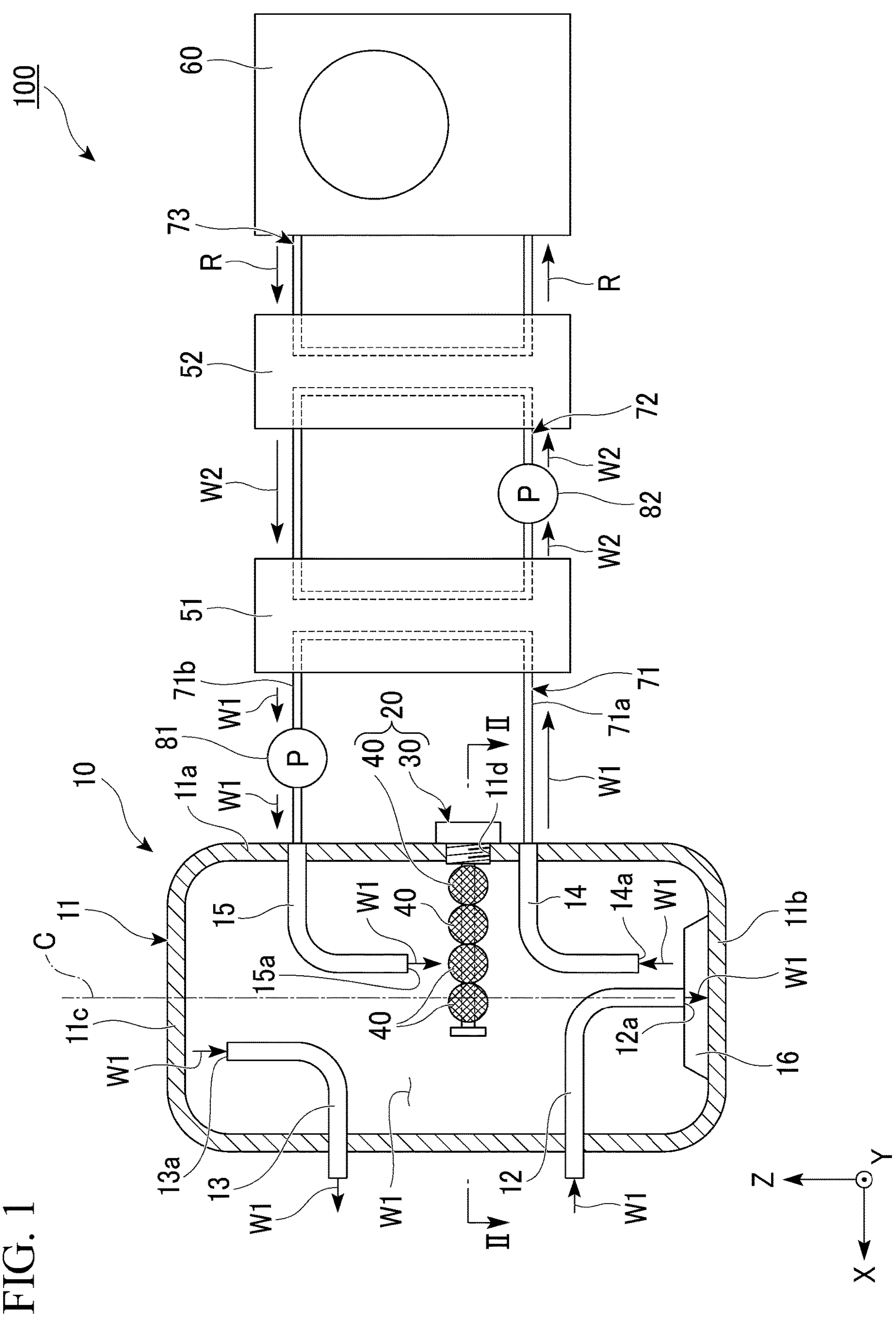
FIG. 1 A view that schematically shows a water heater in a first embodiment.

Hereinafter, embodiments of the present disclosure are explained with reference to the drawings. The scope of the present disclosure is not limited to the embodiments below, and may be changed so long as the embodiments do not depart from the technical scope of the present disclosure. In the drawings below, scales and dimensions of various configurations may differ from scales and dimensions in the drawings below to facilitate better understanding of the various embodiments.

The drawings show an X axis, a Y axis, and a Z axis where appropriate. The X axis shows a direction out of a horizontal direction. The Y axis shows another of the horizontal direction. The Z axis shows a vertical direction. In the explanation below, a horizontal direction along the X axis is referred to as a "first horizontal direction X", a horizontal direction along the Y axis is referred to as a "second horizontal direction Y", and a vertical direction is referred to as a "vertical direction Z". The first horizontal direction X, the second horizontal direction Y, and the vertical direction Z are mutually orthogonal directions. In the explanation below, a direction out of the vertical direction Z in which an arrow of the Z axis points to (+Z side) is referred to as "top direction". The other direction out of the vertical direction Z which faces an opposite side the arrow of the Z axis points to (−Z side) is a "bottom direction". A direction out of the first horizontal direction X in which an arrow of the X axis points to (+X side) is referred to as a "one side in the first horizontal direction X". The other direction out of the first horizontal direction X which faces an opposite direction the arrow of the X axis points to (−X side) is referred to as "other side of the first horizontal direction X".

First Embodiment

FIG. 1 is a view that schematically shows a water heater 100 in a first embodiment. As shown in FIG. 1, the water heater 100 includes a tank 10, a first heat exchanger 51, a second heat exchanger 52, an outdoor unit 60, a first flow path 71, a second flow path 72, and a third flow path 73. The tank 10 and the first heat exchanger 51 are connected to one another via the first flow path 71. The first heat exchanger 51 and the second heat exchanger 52 are connected to one another via the second flow path 72. The second heat exchanger 52 and the outdoor unit 60 are connected to one another via the third flow path 73.

The tank 10 includes a tank main body 11, a water supply pipe 12, a water heater pipe 13, an outflow pipe 14, an inflow pipe 15, and a buffer 16. The tank main body 11 stores water W1 as a liquid on an inside thereof. The tank main body 11 is a cylindrical shape that extends in the vertical direction Z. In the explanations below, there are cases where a radial direction having a center be a center axis C of the cylindrical shaped tank main body 11, simply be referred to as a "radial direction". The center axis C is a theoretical line that extends in the vertical direction Z. In other words, the vertical direction Z in the first embodiment is an axial direction of the center axis C. The tank main body 11 is disposed along the center axis C. The tank main body 11 has a circumferential wall 11*a* that is cylindrically shaped, a bottom wall 11*b* provided on a bottom end of the circumferential wall 11*a*, and a ceiling wall 11*c* provided on a top end of the circumferential wall 11*a*. An inside of the tank main body 11 is sealed. The inside of the tank main body 11 is for example, entirely filled with the water W1. When the water heater 100 is in a condition of operation, the water W1 stored on the inside of the tank main body 11 is heated to become hot water.

The tank main body 11 has a through hole 11*d* that penetrates a wall of the tank main body 11. The through hole 11*d* in the first embodiment penetrates a part of the circumferential wall 11*a* in the in the radial direction. To be more specific, the through hole 11*d* penetrates a portion located on the other side (−X side) in the first horizontal direction X out of the circumferential wall 11*a*, in the first horizontal direction X. The through hole 11*d* in the first embodiment is a female thread hole that has female threads provided on an inner circumferential surface thereof.

As a material that configures the tank main body 11, a metal, a resin, or an inorganic solid material may be used. As the metal that makes up the tank main body 11, various stainless steels, iron, steel, brass, aluminum, zinc, tin, titanium, chromium, nickel, magnesium, tungsten, gold, silver, and white gold may be mentioned for example. An alloy which includes any one or more of the aforementioned metals may be used as a metal that configures the tank main body 11. The material that configures the tank main body 11 may be a material that has an enamel, or a metallic surface coating applied thereto. As an example of the resin which configures the tank main body 11, polyethylene, polypropylene, vinyl chloride, polystyrene, polyethylene terephthalate, polycarbonate, polyamide, polyacetal, various fluorine resins, phenolic resin, melamine resin, and epoxy resin or the like may be mentioned. As the inorganic solid material that configures the tank main body 11, glass and ceramic or the like may be mentioned. The material that configures the tank main body 11 may be a combination out of any of the aforementioned materials, where the other material acts as a coating for the first material.

The water supply pipe 12 is a pipe for supplying the water W1 to the inside of the tank main body 11. The water supply pipe 12 is attached from a bottom side portion of the tank main body 11. The water supply pipe 12 is fixed to the circumferential wall 11*a*. The water supply pipe 12 in the first embodiment is fixed to a wall located on the one side (+X side) in the first horizontal direction X, out of the circumferential wall 11*a*. The location to which the water supply pipe 12 is fixed is not particularly limited. A part of the water supply pipe 12 is located on the inside of the tank main body 11. The portion out of the water supply pipe 12 located on the inside of the tank main body 11 extends in a semi-L shape from the circumferential wall 11*a*, and bends to the bottom direction after extending to an inside thereof in the radial direction. An end of the water supply pipe 12 is disposed on an outside of the tank main body 11, and is connected to a water pipe not shown on the drawings.

The water supply pipe 12 has a water supply opening 12*a* that opens to the inside of the tank main body 11. The water supply opening 12*a* is the other end of the water supply pipe 12. The water W1 that is supplied from the water pipe that is not shown on the drawing flows on an inside of the water supply pipe 12 and is supplied to the inside of the tank main body 11 from the water supply opening 12*a*. The water supply opening 12*a* is located on a bottom end on the inside of the tank main body 11, and opens towards the bottom direction. The water supply opening 12*a* is separately located above from the bottom wall 11*b*. The water supply opening 12*a* in the first embodiment is connected to the buffer 16 provided above the bottom wall 11*b*. The water W1 discharged to the bottom direction from the water supply opening 12*a* in the tank main body 11 is rectified by the buffer 16.

The water heater pipe 13 is a pipe that discharges the water W1 of the inside of the tank main body 11 to the outside of the tank main body 11. The water W1 that is discharged from the water heater pipe 13 to the outside of the tank main body 11 is heated in the tank main body 11, and has become hot water. The water heater pipe 13 is attached to a top side portion of the tank main body 11. The water heater pipe 13 is located in the top direction more than the water supply pipe 12. The water heater pipe 13 is fixed to the circumferential wall 11*a*. The water heater pipe 13 in the first embodiment is fixed to the wall located on the one side (+X side) in the first horizontal direction X out of the circumferential wall 11*a*. The location to which the water heater pipe 13 is fixed to is not limited. A part of the water heater pipe 13 is located on the inside of the tank main body 11. The portion out of the water heater pipe 13 located on the inside of the tank main body 11 extends in a semi-L shape from the circumferential wall 11*a*, and bends to the top direction after extending to an inside thereof in the radial direction. An end of the water heater pipe 13 is disposed on the outside of the tank main body 11, and is for example, connected to a pipe connected to a faucet that is used by a user.

The water heater pipe 13 has an intake opening 13*a* that opens to the inside of the tank main body 11. The intake opening 13*a* is the other end of the water heater pipe 13. For example, when the user opens the faucet, the water W1 that has become hot water is taken into an inside of the water heater pipe 13 from the intake opening 13*a*. The water W1 that has become hot water flows on the inside of the water heater pipe 13 and combines with tap water that has not been heated, and is discharged from the opened faucet after reaching a temperature that is set by the user. The intake opening 13*a* is located on a top end on the inside of the tank main body 11, and opens to the top direction thereof. The intake opening 13*a* is separately located below from the ceiling wall 11*c*. Since the water W1 that has been heated and has a relatively high temperature flows to the top direction of the inside of the tank main body 11, by disposing the intake opening 13*a* above, having a temperature of the water W1 that is taken in by the intake opening 13*a* and is then discharged by the faucet be a desired temperature thereof becomes easier.

The outflow pipe 14 is a pipe that causes the water W1 of the inside of the tank main body 11 to flow to the outside of the tank main body 11. The water W1 of the inside of the tank main body 11 that flows from the outflow pipe 14 passes through an inside of the first flow path 71, and is sent to the first heat exchanger 51. The outflow pipe 14 is attached to the bottom side portion of the tank main body 11. The outflow pipe 14 is fixed to the circumferential wall 11*a*. The outflow pipe 14 in the first embodiment is fixed to the wall located on the other side (−X side) in the first horizontal direction X out of the circumferential wall 11*a*. The location to which the outflow pipe 14 is fixed to is not limited. A part of the outflow pipe 14 is located on the inside of the tank main body 11. The portion out of the outflow pipe 14 located on the inside of the tank main body 11 extends in a semi-L shape from the circumferential wall 11*a*, and bends to the bottom direction after extending to an inside thereof in the radial direction. An end of the outflow pipe 14 is disposed on the outside of the tank main body 11, and is connected to a pipe 71*a* which is connected to the first heat exchanger 51 and the tank 10.

The outflow pipe 14 has an outflow opening 14*a* that opens to the inside of the tank main body 11. The outflow opening 14*a* is the other end of the outflow pipe 14. The water W1 on the inside of the tank main body 11 is taken into the outflow opening 14*a*. The outflow opening 14*a* is located on the bottom side portion in the tank main body 11, and opens to the bottom direction thereof. The outflow opening 14*a* is separately located above from the bottom wall 11*b*. The outflow opening 14*a* is located in the top direction more than the water supply opening 12*a* of the water supply pipe 12.

The inflow pipe 15 is a pipe that causes the water W1 to flow to the inside of the tank main body 11 again after the water W1 flows to the outside of the tank main body 11 via the outflow pipe 14. The water W1 that passes through the first heat exchanger 51 after flowing to the outside of the tank main body 11 via the outflow pipe 14, flows into the tank main body 11 from the inflow pipe 15. The inflow pipe 15 is attached to the top side portion of the tank main body 11. The inflow pipe 15 is fixed to the circumferential wall 11*a*. The inflow pipe 15 in the first embodiment is fixed to the wall located on the other side (−X side) in the first horizontal direction X out of the circumferential wall 11*a*. The location to which the inflow pipe 15 is fixed to is not limited. The inflow pipe 15 is located above the outflow pipe 14. A portion of the inflow pipe 15 is located on the inside of the tank main body 11. The portion out of the inflow pipe 15 located on the inside of the tank main body 11 extends in a semi-L shape from the circumferential wall 11*a*, and bends to the bottom direction after extending to an inside thereof in the radial direction. An end of the inflow pipe 15 is disposed on the outside of the tank main body 11, and is connected to a pipe 71*b* which is connected to the first heat exchanger 51 and the tank 10.

The inflow pipe 15 has an inflow opening 15*a* that opens to the inside of the tank main body 11. The inflow opening 15*a* is the other end of the inflow pipe 15. The water W1 on the inside of the tank main body 11 is taken into the inflow opening 15*a*. The inflow opening 15*a* in the first embodiment is located on the top side portion in the tank main body 11. The inflow opening 15*a* opens to the bottom direction in the vertical direction Z. The inflow opening 15*a* is located more to the bottom direction than the intake opening 13*a* of the water heater pipe 13, and is located more to the top direction than the outflow opening 14*a* of the outflow pipe 14.

Figure 2:
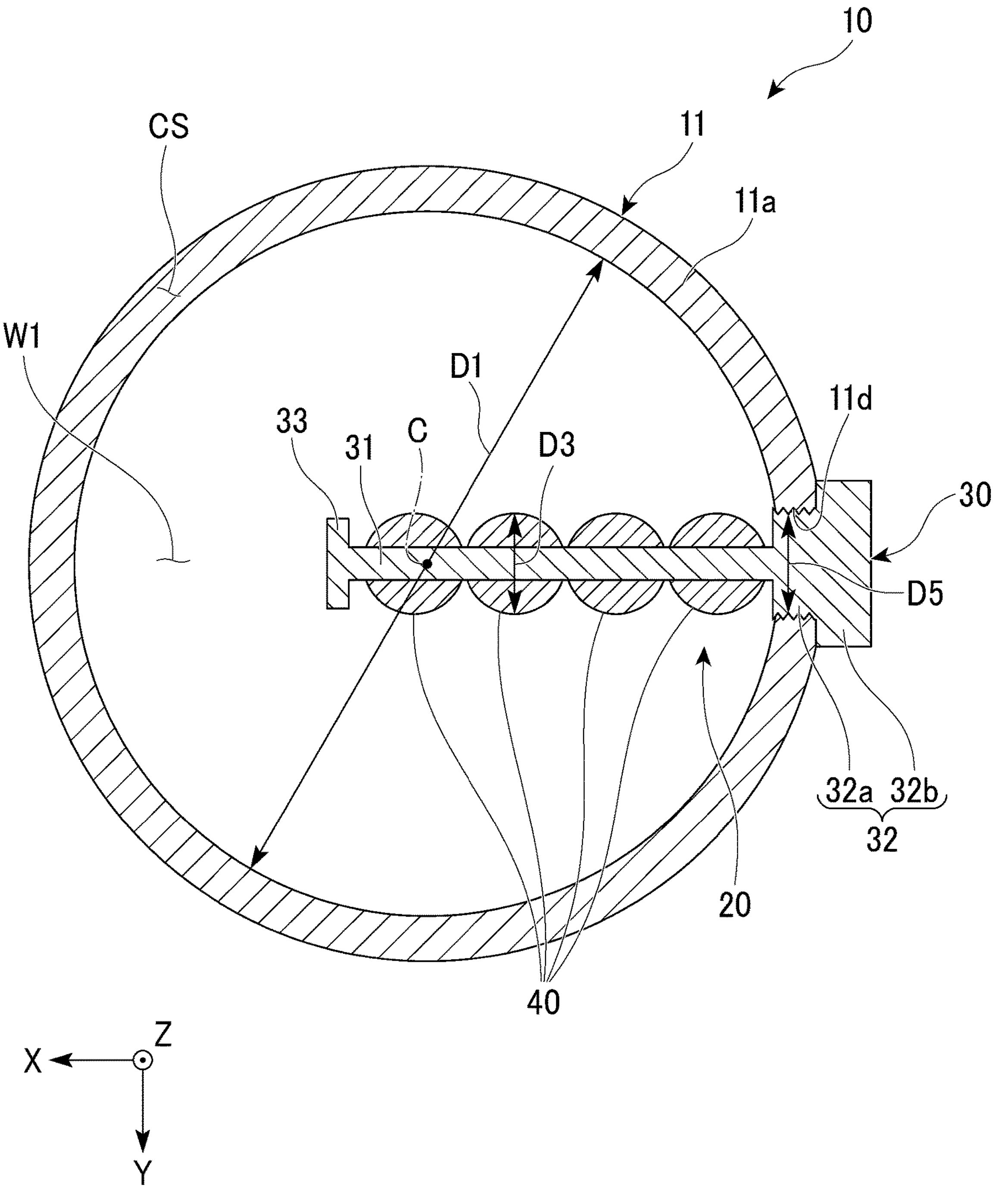
FIG. 2 A cross-sectional view that shows a part of a tank in the first embodiment, taken from cross-section line II-II in FIG. 1.
Figure 3:
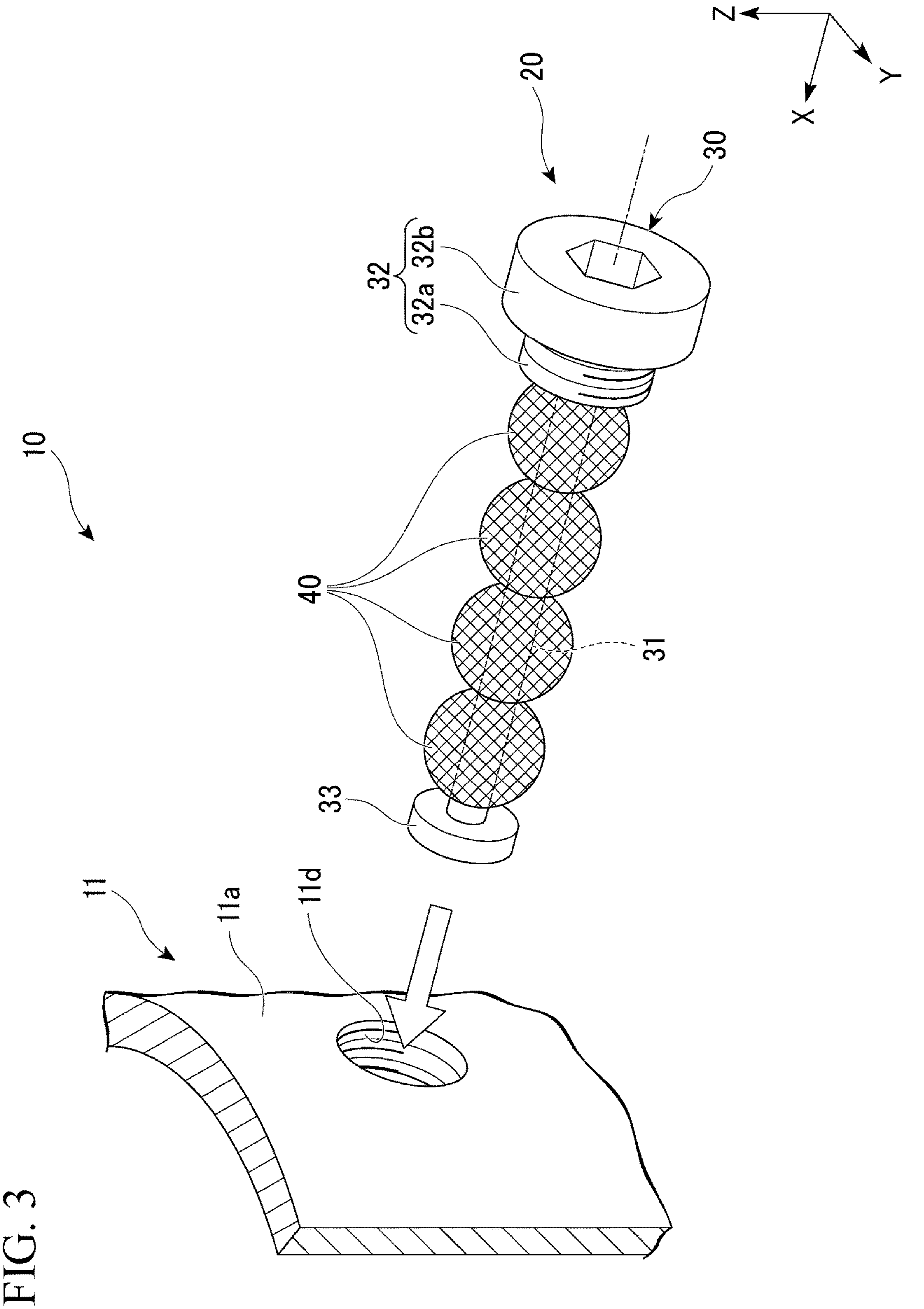
FIG. 3 A perspective view that shows a part of a tank main body and a trapping unit in the first embodiment.
Figure 4:
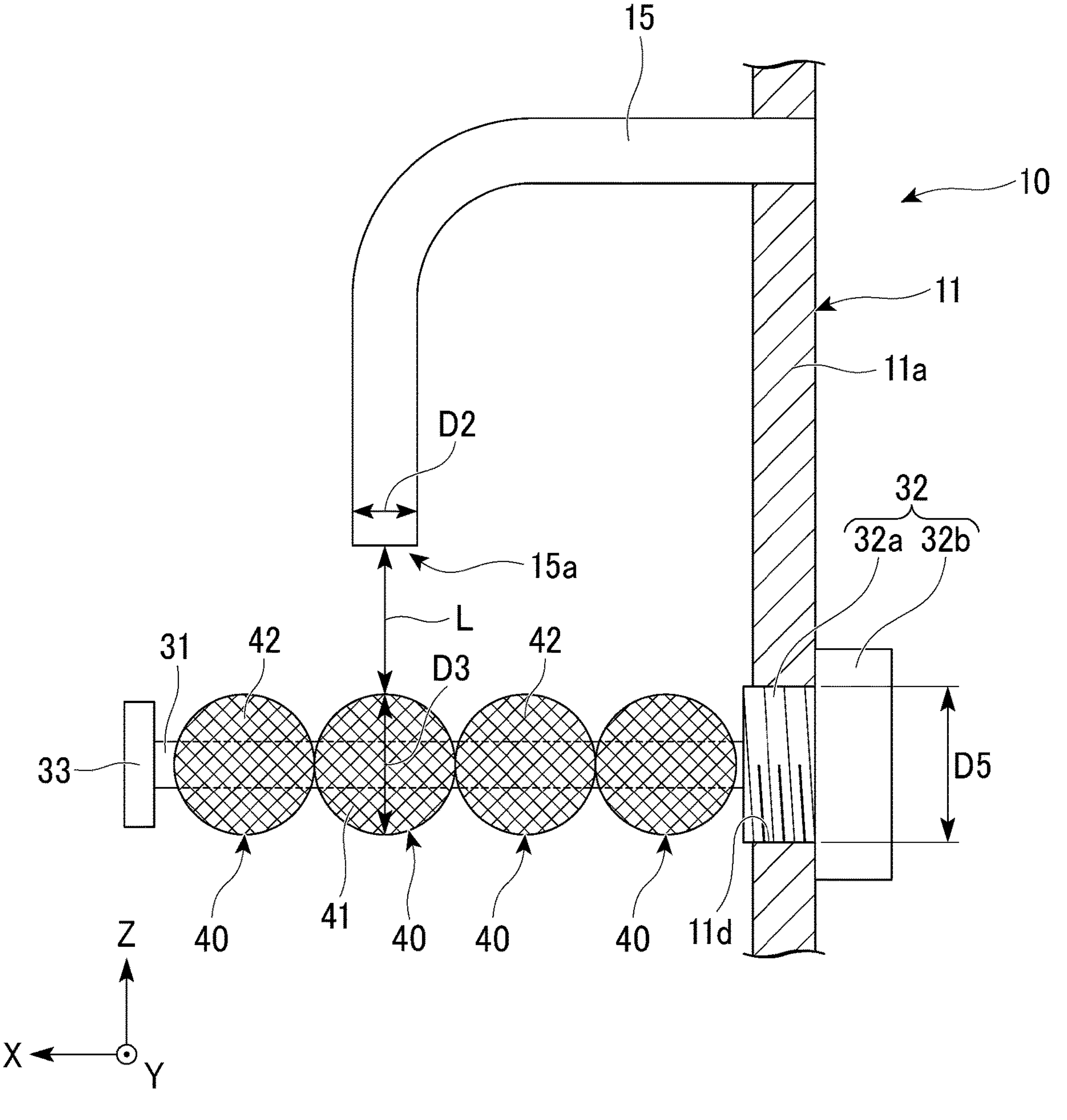
FIG. 4 A cross-sectional view that shows a part of a tank, and is a detailed view of FIG. 1, in the first embodiment.

The tank 10 includes a trapping unit 20 that is disposed on the inside of the tank main body 11. FIG. 2 is a cross-sectional view that shows a part of the tank 10 in the first embodiment, taken from cross-section line II-II in FIG. 1. FIG. 3 is a perspective view that shows a part of the tank main body 11 and the trapping unit 20. FIG. 4 is a cross-sectional view that shows a part of the tank 10, and is a detailed view of FIG. 1.

As shown in FIG. 2 to FIG. 4, the trapping unit 20 has a support member 30 that is fixed to the tank main body 11, and a trapping material 40 that is attached to the support member 30. The support member 30 is a member for supporting the trapping material 40 on the inside of the tank main body 11. The support member 30 in the first embodiment extends in the first horizontal direction X. It is possible to configure the material of the support member 30 to be the same material as the material that the tank main body 11, or the material that the trapping material 40 is configured from. The support member 30 in the first embodiment is fixed to a portion located on the other side (−X side) in the first horizontal direction X out of the circumferential wall 11*a* of the tank main body 11. The support member 30 has a support member main body 31, a fixing portion 32, and a retaining portion 33.

As shown in FIG. 2, the support member main body 31 is disposed on the inside of the tank main body 11. The support member main body 31 extends in one direction. The one direction in which the support member main body 31 in the first embodiment extends to is the first horizontal direction X. The support member main body 31 extends in the radial direction. The support member main body 31 intersects the center axis C. The support member main body 31 is a long thin cylinder that extends in the first horizontal direction X. A dimension of the support member main body 31 in the first horizontal direction X is smaller than an inner diameter D1 of the tank main body 11, but is larger than half the inner diameter D1. The support member main body 31 is inserted through from the outside of the tank main body 11 via the through hole 11*d* to the inside of the tank main body 11.

The fixing portion 32 is provided on an end in the outside radial direction of the support member main body 31, in other words, on an end of the other side (−X side) in the first horizontal direction X. The fixing portion 32 in the first embodiment is a bolt. The fixing part 32 has a bolt main body 32*a*, and a bolt head 32*b*. The bolt main body 32*a* is connected to an end in the outside radial direction of the support member main body 31. An outer diameter of the bolt main body 32*a* is larger than an outer diameter of the support member main body 31. A male thread portion is provided on an outer circumferential surface of the bolt main body 32*a*. The male thread portion of the bolt main body 32*a* is fastened to the female thread portion provided on an inner circumferential surface of the through hole 11*d*. Accordingly, the fixing portion 32 is detachably fixed to the through hole 11*d*. Although omitted from the drawings, for example, a sealing material such as a liquid gasket or the like may be provided between the male thread portion of the bolt main body 32*a* and the female thread portion of the through hole 11*d*. The bolt head 32*b* is connected to the outside radial direction of the bolt main body 32*a*. An outer diameter of the bolt head 32*b* is larger than the outer diameter of the bolt main body 32*a*. The bolt head 32*b* is connected to an outer circumferential surface of the circumferential wall 11*a*. The aforementioned sealing material such as a liquid gasket or the like may be provided between the bolt head 32*b* and an outer surface of the tank main body 11. The sealing material may also be an O ring.

The retaining portion 33 is provided on an end on the one side (+X side) in the first horizontal direction out of the support member main body 31. The retaining portion 33 is a disc shape that protrudes to an outside in the in the radial direction of the support member main body 31, having a center be a central axis thereof. An outer diameter of the retaining portion 33 is larger than the outer diameter of the support member main body 31, and is smaller than an inner diameter D5 of the through hole 11*d*.

The trapping material 40 is located on an inside of the tank main body 11. As show in FIG. 1, the trapping material 40 is separately disposed from the water supply opening 12*a*, the intake opening 13*a*, the outflow opening 14*a*, and the inflow opening 15*a*. The trapping material 40 in the first embodiment is spherically shaped. As show in FIG. 4, an outer diameter D3 of the trapping material 40 is larger than an inner diameter D2 of the inflow opening 15*a* of the inflow pipe 15. The outer diameter D3 of the trapping material 40 is less than or equal to the inner diameter D5 of the through hole 11*d*. As shown in FIG. 2, the outer diameter D3 of the trapping material 40 is smaller than the inner diameter D1 of the tank main body 11. More specifically, the outer diameter D3 of the trapping material 40 is smaller than half the inner diameter D1 of the tank main body 11. Even more specifically, the outer diameter D3 of the trapping material 40 is less than or equal to a quarter of the inner diameter D1 of the tank main body 11. The outer diameter D3 of the trapping material 40 is smaller than the dimension of the tank main body 11 in the vertical direction Z, in other words, a dimension in the axial direction of the center axis C in the tank main body 11. To be more specific, the outer diameter D3 of the trapping material 40 is smaller than half a dimension of the tank main body 11 in the vertical direction Z. Even more specifically, the outer diameter D3 of the trapping material 40 is less than or equal to a quarter of the dimension of the tank main body 11 in the vertical direction Z.

The trapping material 40 is provided on a part of the inside of the tank main body 11 in a cross-section CS that includes the trapping material 40 so as to be orthogonal to the vertical direction Z, in other words, the axial direction of the center axis C. In other words, the inside of the tank main body 11 has a region in the cross-section CS in which the trapping material 40 is not disposed. The cross-section CS is a cross-section that includes a center of the trapping material 40 out of a cross-section of the tank 10 which is orthogonal to the vertical direction Z. The cross-section CS includes a plurality of cross-sections of the trapping material 40, and a cross-section of the support member 30 of the tank main body 11. A surface area of a region in which the trapping material 40 is disposed on in the cross-section CS is less than or equal to half a cross-sectional area of the inside of the tank main body 11. The surface area of the region in which the trapping material 40 is disposed on in the cross-section CS is less than or equal to a quarter of the cross-sectional area of the inside of the tank main body 11. As is to be mentioned later on, since a plurality of trapping materials 40 are provided in the first embodiment, the surface area of the region in which the trapping material 40 is provided on in the cross-section CS is the sum of surface areas of regions the plurality of trapping materials 40 that are provided on in the cross-section CS.

The trapping material 40 in the first embodiment is made of metal. As a metal that configures the trapping material 40, various stainless steels, iron, steel, copper, brass, aluminum, zinc, tin, titanium, chromium, nickel, magnesium, tungsten, gold, silver, and white gold may be mentioned for example. An alloy which includes any one or more of the aforementioned metals may be used as a metal that configures the trapping material 40.

Figure 5:
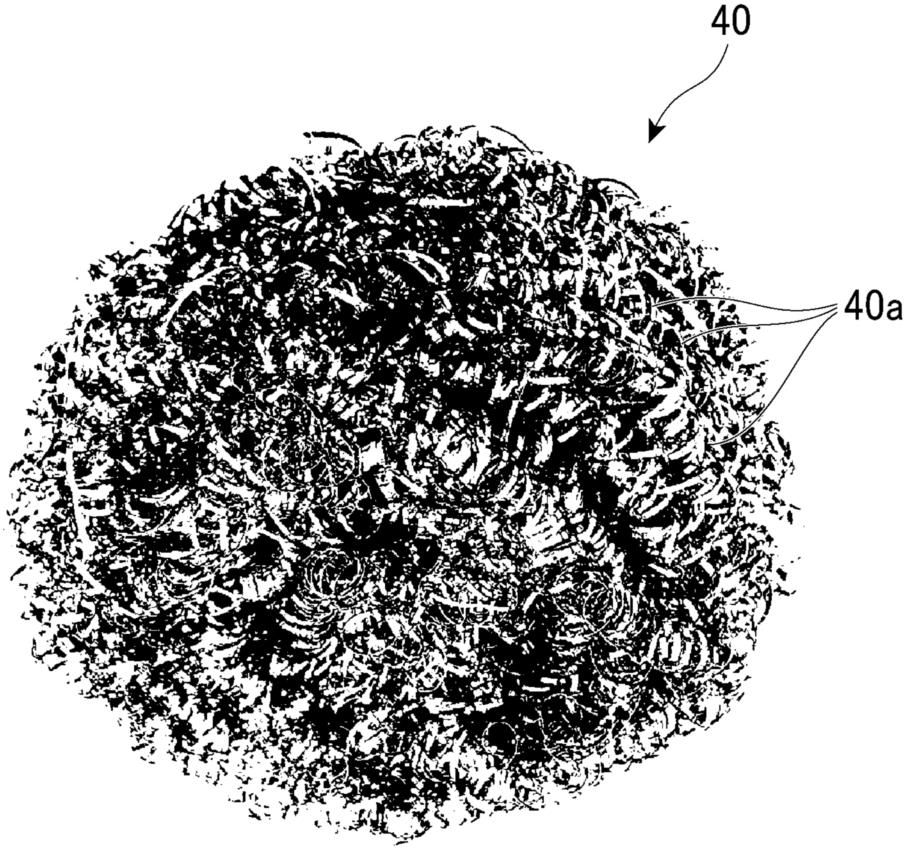
FIG. 5 A view that shows a trapping material in the first embodiment.
Figure 6:
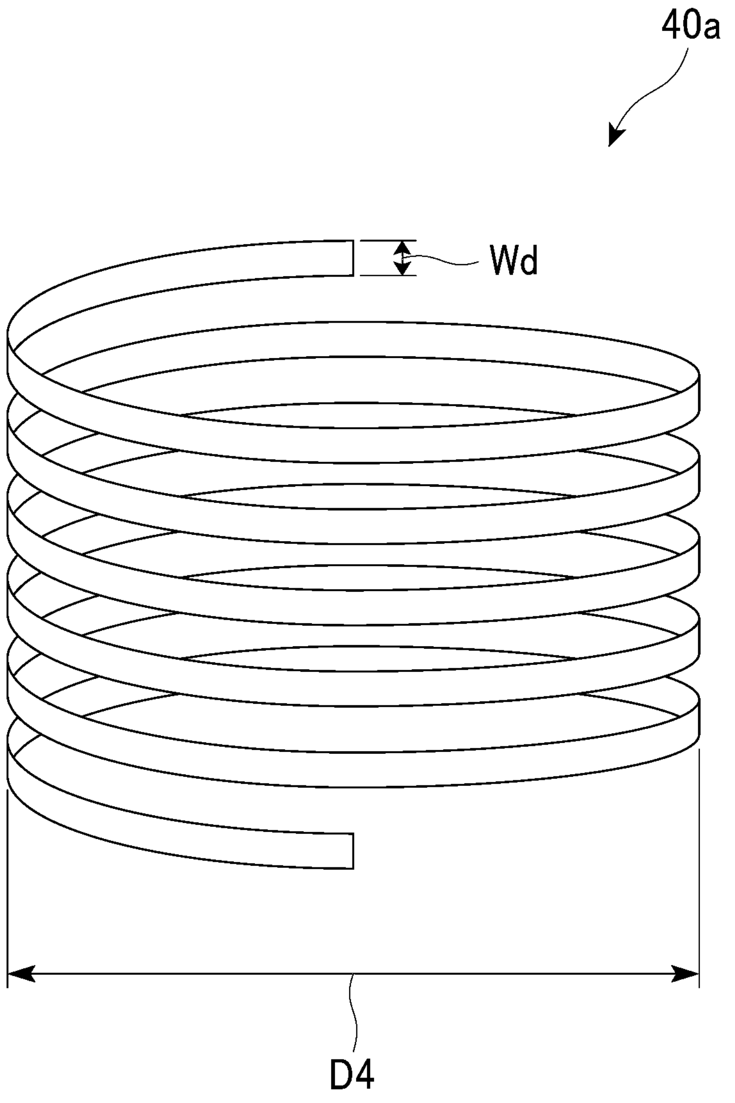
FIG. 6 A view that shows a fiber of metallic fibers in the first embodiment.

FIG. 5 is a view that shows the trapping material 40 in the first embodiment. As shown in FIG. 5, the trapping material 40 in the first embodiment is configured of a plurality of metallic fibers 40*a* intertwined with one another. The plurality of metallic fibers 40*a* are three-dimensionally intertwined with one another in various directions to form the spherically shaped trapping material 40. Metallic fibers 40*a* are formed of the aforementioned metal or the like which configures the trapping material 40. FIG. 6 is a view that shows a fiber of the metallic fibers 40*a*. As shown in FIG. 6, the fiber of the metallic fibers 40*a* extends in a spiral shape. An inner diameter D4, in other words, a curl radius of the fiber of the metallic fibers 40*a* that extends in a spiral shape is for example, less than or equal to 10 mm. A width Wd of the fiber of the metallic fibers 40*a*, in other words fiber radius, is for example less than or equal to 2 mm. The width Wd of the fiber of the metallic fibers 40*a* is smaller than the inner diameter D4 of the metallic fibers 40*a*.

Since the trapping material 40 is made of the metallic fibers 40*a* which are spiral shapes that intertwine in various directions, there are cases where each of the fibers of metallic fibers 40*a* are a collapsed spiral shape, and the inner diameter D4 of the fiber of the metallic fibers 40*a* is not constant. A numerical range of the aforementioned inner diameter D4 of the fiber of the metallic fibers 40*a* may be a numerical value that satisfies an average value of inner diameters D4 of the metallic fibers 40*a* in a state where the plurality of metallic fibers 40*a* are intertwined, or may be a numerical value that satisfies the inner diameter D4 of the metallic fibers 40*a* before the inner diameters of the metallic fibers 40*a* collapse.

The phrase "the spherically shaped trapping material 40" does not strictly limit a shape of the trapping material 40 to a spherical one, and includes cases where the shape of the trapping material 40 is semi-spherical. When the shape of the trapping material 40 is semi-spherical, for example, as shown in a case where the trapping material 40 is viewed from one direction as shown in FIG. 5, a case of a distorted circular shape thereof is included. The phrase "a fiber of the metallic fibers 40*a* extends in a spiral shape" does not strictly limit the shape in which the fiber of the metallic fibers 40*a* extends in to a spiral shape, and includes cases where the shape of the fiber of the metallic fibers 40*a* extends in a semi-spiral shape. The fiber of the metallic fibers 40*a* extending in a semi-spiral shape includes, for example, the aforementioned case where the metallic fibers 40*a* are collapsed spiral shapes.

Since the trapping material 40 is configured of the plurality of metallic fibers 40*a* that are intertwined with one another, a gap is provided between the metallic fibers 40*a*. A proportion of the gaps in a spherically shaped trapping material 40, in other words, a gap ratio ε [%] is expressed by equation (1) shown below.

$$\varepsilon = 100(1 - V1/V0) \quad \text{Equation (1)}$$

V1 is a sum of volumes of the plurality of metallic fibers 40*a* that configure the trapping material 40. V0 is an empty volume that the gap of the spherically shaped trapping material 40 occupies. The gap ratio ε [%] in the first embodiment is greater than or equal to 90%. Even in cases where the aforementioned spiral shaped metallic fibers 40*a* collapse, the ε [%] greater than or equal to 90% is maintained. By having the gap ratio ε [%] be greater than or equal to 90%, it is possible for the water W1 to pass through the trapping material 40 without any resistance almost.

As shown in FIG. 4, the plurality of trapping materials 40 are provided so as to align in one direction, in the first embodiment. The direction in which the plurality of trapping materials 40 align in the first embodiment is the first horizontal direction X. Four trapping materials 40 are provided. The plurality of trapping materials 40 are attached to the support member main body 31. The plurality of trapping materials 40 have the support member main body 31 that extends in the first horizontal direction X inserted through. The support member main body 31 penetrates the plurality of trapping materials 40 in the first horizontal direction X. By providing the retaining portion 33 in the first embodiment, the plurality of trapping materials 40 are suppressed from coming off of the support member main body 31 in the one side (+X side) in the first horizontal direction X. As shown in FIG. 1, the plurality of trapping materials 40 in the first embodiment are disposed more to the bottom direction than a center of the tank main body 11 in the vertical direction Z.

As shown in FIG. 4, the plurality of trapping materials 40 include a first trapping material 41. The first trapping material 41 is disposed so as to face the inflow opening 15*a* of the inflow pipe 15 with a space therebetween. The first trapping material 41 is located below the inflow opening 15*a* in the vertical direction Z. A distance L between the first trapping material 41 and the inflow opening 15*a* is larger than the inner diameter D2 of the inflow opening 15*a*. Only one first trapping material 41 is provided in the first embodiment.

The plurality of trapping materials 40 include a second trapping material 42. The second trapping material 42 is disposed beside the first trapping material 41. The second trapping material 42 is in contact with the first trapping material 41. Two second trapping materials 42 are provided in the first embodiment. The two second trapping materials 42 are disposed so as to sandwich the one first trapping material 41 in the first horizontal direction X.

The sum of the surface areas of the plurality of trapping materials 40 is larger than a sum of an inner area of the first flow path 71. The surface area of one of the trapping materials 40 is the sum of the surface area of the plurality of metallic fibers 40*a* which configure the said trapping material 40. The first flow path 71 in the first embodiment is configured by the tank main body 11, the outflow pipe 14, the inflow pipe 15, the pipes 71*a* and 71*b*, and the flow path provided on an inside of the first heat exchanger 51. The sum of the inner surface area of first flow path 71 is a sum of inner surface areas of the surfaces of various parts that configure the first flow path 71. The sum of the inner surface area of the first flow path 71 includes a surface area of the first flow path 71 that is provided on the inside of the first heat exchanger 51, an inner surface area of the outflow pipe 14, an inner surface area of the inflow pipe 15, inner surface areas of the pipes 71*a* and 71*b*, and an inner surface area of the tank main body 11.

When the water W1 on the inside of the tank main body 11 contacts the trapping material 40, calcium carbonate and other components included in the water W1 precipitate, and attach to the trapping material 40. As such, the precipitated calcium carbonate and other components included in the water W1 are referred to as "scale". The main component of scale is for example made to be calcium carbonate. The calcium carbonate component included in the water W1 becomes larger as the water becomes harder water. For such reason, compared to a case where the water W1 is soft water, it is easier for scale to precipitate when the water W1 is hard water.

The scale attaches to the surface of the metallic fibers 40*a* which configure the trapping material 40. With the scale being attached to the trapping material 40, when the portion of the trapping material 40 having scale attached contacts the water W1, crystal growth occurs at the portion of the trapping material 40 having scale attached, with the scale attached thereto as the starting point. As such, scale precipitation at the trapping material 40 is accelerated, and it is possible to appropriately have the scale components within the water W1 attach to the trapping material 40. As such, since it is possible to trap the scale components within the water W1 by the trapping material 40, it is possible to suppress scale from attaching to an inner surface of the tank main body 11, and inner surfaces of the various pipes and the like connected to the tank main body 11.

An operator disposing the trapping material 40 within the tank main body 11 inserts the support member 30 with the plurality of trapping materials 40 attached, in other words, the trapping unit 20, to the inside of the tank main body 11 from the outside thereof to the inside of the through hole 11*d*, as shown by the arrow in FIG. 3. The support member main body 31, the retaining portion 33, and the trapping material 40 are large enough to be able to pass through the through hole 11*d*. The operator fastens the bolt main body 32*a* of the fixing portion 32 to the inside of the through hole 11*d* which is a female thread hole, fixing the support member 30 to the tank main body 11. At such time, the operator applies a liquid gasket which is in a non-solid state, to an outer surface of the bolt main body 32*a* or an inner surface of the through hole 11*d*. Accordingly, after fastening the bolt main body 32*a* to the through hole 11*d*, by the liquid gasket solidifying, the space between the through hole 11*d* and the bolt main body 32*a* is sealed.

As shown in FIG. 1, the first heat exchanger 51 is a heat exchanger that conducts heat exchange between the water W1 that flows on an inside of the first flow path 71, and water W2 that flows on an inside of the second flow path 72. The water W2 that flows on the inside of the second flow path 72 is for example, the same type of water as the water W1 that flows on the inside of the first flow path 71. The water W2 that flows on the inside of the second flow path 72 may be a different type of water than the water W1 that flows through the first flow path 71. Further, a liquid that flows through the second flow path 72 may be any other liquid other than water. The first heat exchanger 51 for example, may be a plate type heat exchanger. The type of the first heat exchanger 51 is not strictly limited to a plate type heat exchanger, and may be any other type.

The second heat exchanger 52 is a heat exchanger that conducts heat exchange between the water W2 that flows on the inside of the second flow path 72, and a refrigerant R that flows on an inside of the third flow path 73. A refrigerant such as a fluorine based refrigerant with a low global warming potential (GWP: Global Warming Potential), or a hydrocarbon based refrigerant or the like may be mentioned as examples of the refrigerant R. The second heat exchanger 52 is for example, a plate type heat exchanger. The type of the second heat exchanger 52 is not strictly limited to a plate type heat exchanger, and may be any other type.

The first heat exchanger 51 and the second heat exchanger 52 are heat exchangers that are connected to the tank 10. The first heat exchanger 51 is connected to the tank 10 via the first flow path 71. The second heat exchanger 52 is connected to the tank 10 via the first flow path 71, the first heat exchanger 51, and the second flow path 72. The outdoor unit 60 is connected to the first heat exchanger 51 and the second heat exchanger 52. The first heat exchanger 51 is connected to the outdoor unit 60 via the second flow path 72, the second heat exchanger 52, and the third flow path 73.

A first pump 81 that circulates the water W1 on the inside of the first flow path 71 is provided in the first flow path 71. A second pump 82 that circulates the water W2 on the inside of the second flow path 72 is provided in the second flow path 72. Although not shown on the drawings, a compressor that circulates the refrigerant R on the inside of the third flow path 73 is provided in the outdoor unit 60. A heat exchanger that is not shown on the drawings is provided in the outdoor unit 60.

The refrigerant R that flows on the inside of the third flow path 73 passes through the second heat exchanger 52 in a state of relatively high temperature, via the compressor and the heat exchanger that are not shown and that are provided on the outside of the outdoor unit 60. The water W2 that flows on the inside of the second flow path 72 absorbs heat from the refrigerant R in the second heat exchanger 52. Accordingly, the water W2 that passes through the second heat exchanger 52 is heated, and becomes hot water. Out of the water W1 on the inside of the first flow path 71, the water W1 that flows to the outside of the tank main body 11 via the outflow pipe 14 absorbs heat from the water W2 in the first heat exchanger 51. Accordingly, the water W1 that passes through the first heat exchanger 51 is heated and becomes hot water. The water W1 which has become hot water flows into the tank main body 11 from the inflow pipe 15. As such, it is possible to heat up the water W1 on the inside of the tank main body 11 and turn the water W1 to hot water. Therefore, it is possible for the operator to extract the water W1 that is in a state of being hot water, from the tank main body 11 via the water heater pipe 13.

When a part of the water W1 is discharged to the outside of the tank main body 11 via the water heater pipe 13, the same amount of water W1, as the water W1 that is discharged, is supplied to the inside of the tank main body 11 from the water supply pipe 12. By using a remote controller that is not shown, it is possible for the operator to have the water heater 100 be in a hot water supply mode which heats the water W1 on the inside of the tank main body 11. It is also possible for the operator to use the heat of the water W2 that is heated by the second flow path 72, which is heated by the refrigerant R, to heat up an inside of a room or the like. In such a case for example, a radiator or the like of an indoor heating device that is not shown on the drawings is connected to the second flow path 72.

As components such as calcium carbonate or the like included in the water W1 precipitate and attach to the inner surface of the tank main body 11 and the inner surfaces of various pipes as scale, the flow path of the water W1 becomes narrower, and a problem of pressure loss increasing when the water W1 flows exists. Once scale attaches to the first heat exchanger 51, a problem of heat transfer performance between the first flow path 71 and the second flow path 72 decreasing, and heating of the water W1 becoming difficult exists. Calcium carbonate differs from typical compounds in that solubility thereof decreases as the temperature of the hot water W1 increases. As such, a problem of scale, having calcium carbonate as the main component, easily precipitating in the water heater 100 that heats the water W1 exists. As such, conventionally, a trapping material that has the scale attach thereto is provided separately, in order to suppress having the scale attach to the inner surface of the tank main body 11, the inner surfaces of the various pipes, and the first heat exchanger 51 or the like. However, by only disposing a trapping material, when the scale attaches, the gaps of the trapping material are clogged or the like with scale, and there are cases where the flow of the water W1 is hindered by the trapping material, which forms a resistance to the flow. Specifically, when the trapping material is provided on an inside of the inflow pipe 15 or the like and scale is attached, gaps of the trapping material are clogged, the inside of said pipes are blocked by the trapping material, and it is then difficult for the water W1 to pass through the inside of said pipes. As such, a problem of the pressure loss that occurs in the water W1 that flows on the inside of the water heater 100 becoming larger exists.

In response to the problem above, according to the first embodiment, the trapping material 40 is disposed apart from the inflow opening 15*a* and the outflow opening 14*a*, and is provided on a part of the inside of the tank main body 11 in the cross-section CS that includes the trapping material 40 and is orthogonal to the vertical direction Z. As such, an entirety of a portion of the flow path through which the water W1 flows, on the inside of the tank main body 11 is not blocked by trapping material 40. Accordingly, for example, even if the scale that attaches to the trapping material 40 clogs the gaps provided in the trapping material 40, it is possible for the water W1 flowing between the inflow opening 15*a* and the outflow opening 14*a* to avoid the trapping material 40, and to flow through the portion on the inside of the tank main body 11 where the trapping material 40 is not provided. Therefore, it is possible to avoid pressure loss from occurring in the water W1 that flows between the inflow opening 15*a* and the outflow opening 14*a*. As such, according to the first embodiment, it is possible to suppress the pressure loss that occurs when the water W1 stored on the inside of the tank main body 11 flows from becoming larger.

Since it is possible to have the scale within the water W1 attach to the trapping material 40, it is possible to suppress the scale from attaching to the inner surface of the tank main body 11 and the inner surfaces of the various pipes. Accordingly, it is possible to suppress the pressure loss that occurs when the water W1 flows on the inside of the tank main body 11 and on an inside of the various pipes. Since it is possible to have the scale within the water W1 attach to the trapping material 40, it is possible to suppress the scale from attaching to the first heat exchanger 51. Accordingly, it is possible to suppress the heat transfer performance between the first flow path 71 and the second flow path 72 from decreasing, and it is possible to efficiently heat the water W1 on the inside of the tank main body 11. Therefore, it is possible to increase the hot water supply efficiency of the water heater 100.

According to the first embodiment, the tank 10 includes the first trapping material 41 as the trapping material 40. The first trapping material 41 is disposed so as to face the inflow opening 15*a*, with a space therebetween. As such, the water W1 that flows to the inside of the tank main body 11 from the inflow opening 15*a* is appropriately supplied to the first trapping material 41. Accordingly, it is possible to have the scale included in the water W1 that flows into the tank main body 11 to appropriately attach to the first trapping material 41. As in the first embodiment, when the inflow pipe 15 having the inflow opening 15*a* is connected to the first heat exchanger 51, the temperature of the water W1, after flowing into the inside of the tank main body 11, is the highest temperature out of temperatures of the water W1 on the inside of the tank main body 11. The higher the temperature of the water W1, the easier it is for the scale to precipitate. Accordingly, by having the inflow opening 15*a* be disposed so as to face the first trapping material 41, it is possible to have the water W1 having a relatively higher temperature flow to the first trapping material 41, and it is possible to have the scale appropriately attach to the first trapping material 41.

According to the first embodiment, the inflow opening 15*a* is open to the bottom direction in the vertical direction Z. The first trapping material 41 is located below the inflow opening 15*a* in the vertical direction Z. Accordingly, it is possible to have the water W1 that is discharged from the inflow opening 15*a* to the inside of the tank main body 11 utilize gravity to more appropriately flow onto the first trapping material 41. As such, it is possible to more appropriately have the scale attach to the first trapping material 41. As in the first embodiment, when the water W1 flows into the inside of the tank main body 11 from the inflow opening 15*a* at a relatively high temperature, when the inflow opening 15*a* is open so as to face the bottom, it is possible to supply the water W1 at a relatively high temperature to a bottom portion of the inside of the tank main body 11. Accordingly, it is possible to easily raise the temperature of the water W1 having relatively low temperature that easily accumulates at the bottom portion of the tank main body 11. Therefore, it is possible to appropriately raise the overall temperature of the water W1 stored on the inside of the tank main body 11. Since it is possible to have flow circulation easily occur on the inside of the tank main body 11, it is possible to appropriately have the water W1 pass through to the trapping materials 40 other than the first trapping material 41 by the said flow circulation. Accordingly, it is possible to have the scale appropriately attach to the other trapping materials 40.

According to the first embodiment, the distance L between the first trapping material 41 and the inflow opening 15*a* is larger than the inner diameter D2 of the inflow opening 15*a*. Accordingly, it is possible to suppress the inflow opening 15*a* from being blocked by the first trapping material 41. Even in a case where gaps of the first trapping material 41 are clogged by the scale, it is possible to have the water W1 that is discharged from the inflow opening 15*a* flow easily, and avoid the first trapping material 41. Therefore, it is possible to appropriately suppress pressure loss from occurring when the water W1 is discharged from the inflow opening 15*a*.

According to the first embodiment, the first trapping material 41 is spherically shaped. The outer diameter D3 of the first trapping material 41 is larger than the inner diameter D2 of the inflow opening 15*a*. As such, it is possible to appropriately pass all of the water W1 that is discharged from the inflow opening 15*a* through the first trapping material 41. Accordingly, it is possible to appropriately have the scale attach to the first trapping material 41.

According to the first embodiment, the tank 10 includes the second trapping material 42 as the trapping material 40. The second trapping material 42 is disposed beside the first trapping material 41, and is in contact with the first trapping material 41. As such, when the scale clogs the gaps in the first trapping material 41, after being discharged from the inflow opening 15*a*, it is easy for the water W1 to avoid the first trapping material 41, and to flow to the second trapping material 42 beside the first trapping material 41. Accordingly, even in a case where too much of the scale attaches to the first trapping material 41, it is possible to appropriately trap the scale components within the water W1 by the second trapping material 42.

According to the first embodiment, the tank 10 includes the support member 30 which is fixed to the tank main body 11. The support member 30 has the support member main body 31 that is disposed on the inside of the tank main body 11. The trapping material 40 is attached to the support member main body 31. As such, it is possible to hold the trapping material 40 in any desired location on the inside of the tank main body 11.

According to the first embodiment, the plurality of trapping materials 40 are disposed side by side in one direction (first horizontal direction X). The support member main body 31 extends in said one direction (first horizontal direction X), and penetrates the plurality of trapping materials 40. As such, it is possible to hold the plurality of trapping materials 40 in any desired location on the inside of the tank main body 11 by the support member 30.

According to the first embodiment, the tank main body 11 has the through hole 11*d* that penetrates the wall of the tank main body 11. The support member main body 31 is inserted through to the inside of the tank main body 11 via the through hole 11*d* from the outside of the tank main body 11. As such, by having the support member main body 31 hold the trapping material 40, the support member main body 31 is inserted through to the inside of the tank main body 11 via the through hole 11*d*, and it is possible to easily dispose the trapping material 40 on the inside of the tank main body 11.

According to the first embodiment, the support member 30 has the fixing portion 32 that is detachably fixed to the inside of the tank main body 11. As such, it is possible to easily fix the support member 30 to the tank main body 11, and it is possible to easily remove the support member 30 from the outside of the tank main body 11. Accordingly, it is possible to easily exchange the trapping material 40 attached to the support member 30. It is possible to use the fixing portion 32 to easily block the through hole 11*d*. As such, it is possible to prevent the water W1 on the inside of the tank main body 11 from leaking to the outside from the through hole 11*d*. As previously mentioned for example, by providing a sealing material such as a liquid gasket or the like between the fixing portion 32 and the inner circumferential surface of the through hole 11*d*, it is possible to appropriately suppress the water W1 on the inside of the tank main body 11 from leaking to the outside from the through hole 11*d*.

According to the first embodiment, the trapping material 40 is made of metal. As such, it is possible to suppress the trapping material 40 from being damaged by the flow of the water W1 on the inside of the tank main body 11. Accordingly, it is possible to maintain the trapping material 40 in a state where scale easily attaches thereto. It is also possible to prevent having a part of the trapping material 40 separate and mix in with the water W1 on the inside of the tank main body 11.

According to the first embodiment, the trapping material 40 is configured of the metallic fibers 40*a* which extend in a spiral shape, and a plurality thereof are intertwined. As such, it is possible to make the surface area of the trapping material 40 appropriately large. Accordingly, it is possible to appropriately have the scale attach to the trapping material 40. In the first embodiment, the sum of the surface areas of the plurality of trapping materials 40 is larger than a sum of surface areas of inner surfaces in the first flow path 71. As such, it is easier to have the scale attach to the surfaces of the plurality of trapping materials 40, than to the inner surfaces of the first flow path 71. By configuring the trapping material 40 from the plurality of metallic fibers 40*a*, it is possible to appropriately have the gap ratio of the trapping material 40 be large. As such, when the water W1 passes through the trapping material 40, it is possible to suppress the water W1 from receiving any resistance from the trapping material 40.

Second Embodiment

Figure 7:
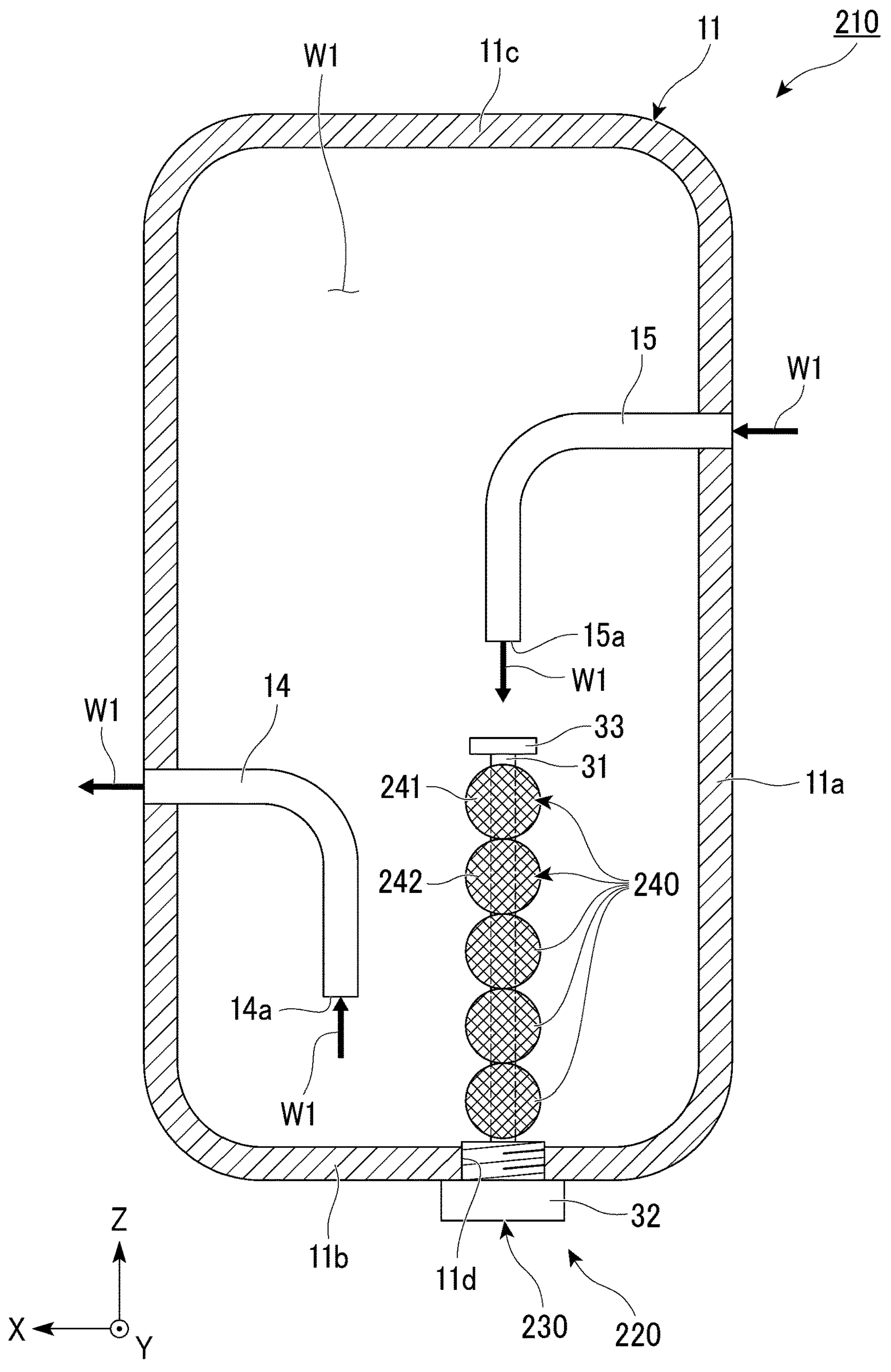
FIG. 7 A cross-section view that shows a tank in a second embodiment.

FIG. 7 is a cross-section view that shows a tank 210 in a second embodiment. In the explanations hereinafter, embodiments having the same configurations as the configurations previously mentioned have the same reference symbols affixed thereto, with explanations thereof omitted.

As shown in FIG. 7, the through hole 11*d* in the second embodiment is provided on the bottom wall 11*b* of the tank main body 11. The outflow pipe 14 in the second embodiment is fixed to a portion located on the one side (+X side) in the first horizontal direction X out of the circumferential wall 11*a* of the tank main body 11. In other words, in the second embodiment, the outflow pipe 14 and the inflow pipe 15 are fixed to portions that are located so as to oppose one another in the first horizontal direction X out of the circumferential wall 11*a*. In FIG. 7, the water supply pipe 12 and the water heater pipe 13 are omitted from the drawings.

A trapping unit 220 is inserted to the inside of the tank main body 11 from below via the through hole 11*d* provided on the bottom wall 11*b* of the tank main body 11. The trapping unit 220 is disposed below the inflow opening 15*a* of the inflow pipe 15. A support member 230 of the trapping unit 220 in the second embodiment extends below the inflow opening 15*a* in the vertical direction Z. The support member main body 31 in the support member 230 extends in the vertical direction Z. The support member main body 31 in the support member 230 is disposed on the bottom side on the inside of the tank main body 11.

In the second embodiment, a plurality of trapping materials 240 are provided side by side in the vertical direction Z. The plurality of trapping materials 240 are disposed on the bottom side portion on the inside of the tank main body 11. Five trapping materials 240 are provided in the second embodiment. The five trapping materials 240 are located below the inflow opening 15*a*. Out of the plurality of trapping materials 240, a trapping material 240 located at the very top is a first trapping material 241 disposed so as to face the inflow opening 15*a* with a space therebetween. The trapping material 240 next to the first trapping material 241 from below is a second trapping material 242. Out of the plurality of tapping materials 240, the trapping material 240 located at the very bottom is located so as to be more to the bottom direction than the outflow opening 14*a* of the outflow pipe 14. Out of the plurality of tapping materials 240, the trapping material 240 located at the very bottom is located so as to be on a bottom end on the inside of the tank main body 11. With the exception of an aspect of disposition on the inside of the tank main body 11, the trapping material 240 is configured to be the same as the trapping material 40 of the first embodiment. Other configurations of various parts in the tank 210 are the same as the other configurations of the various parts the tank 10 of the first embodiment.

Third Embodiment

Figure 8:
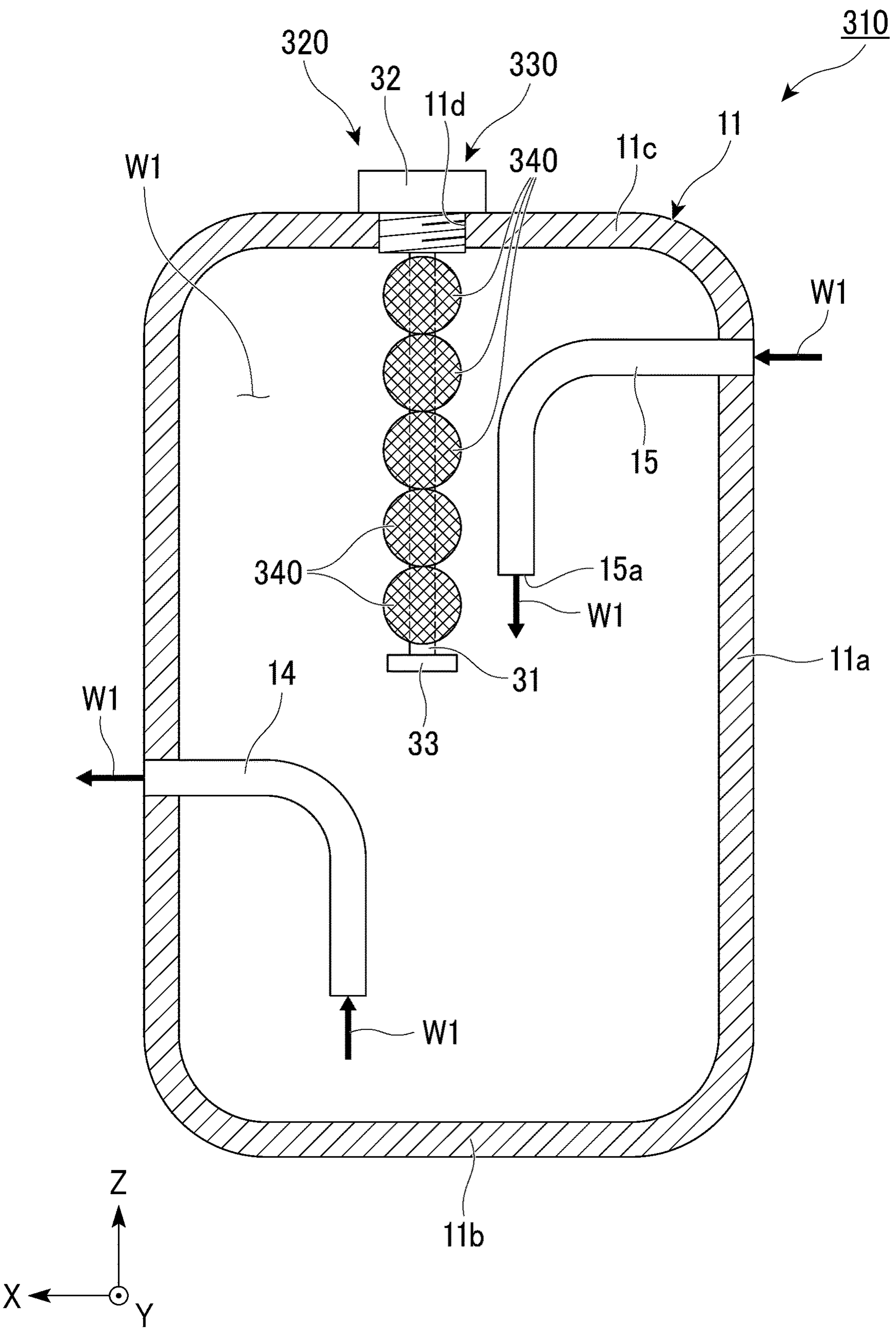
FIG. 8 A cross-section view that shows a tank in a third embodiment.

FIG. 8 is a cross-section view that shows a tank 310 in a third embodiment. In the explanations hereinafter, embodiments having the same configurations as the configurations previously mentioned have the same reference symbols affixed thereto, with explanations thereof omitted.

As shown in FIG. 8, the through hole 11*d* in the third embodiment is provided on the ceiling wall 11*c* of the tank main body 11. Each of the dispositions of the outflow pipe 14 and the inflow pipe 15 in the third embodiment are the same as the dispositions of the outflow pipe 14 and the inflow pipe 15 in the second embodiment. In FIG. 8, the water supply pipe 12 and the water heater pipe 13 are omitted from the drawings.

A trapping unit 320 is inserted to the inside of the tank main body 11 from above, via the through hole 11*d* provided on the ceiling wall 11*c* of the tank main body 11. The trapping unit 320 is disposed on the one side (+X side) of the inflow pipe 15 in the first horizontal direction X. In the third embodiment, a support member 330 of the trapping unit 320 extends in the vertical direction Z. The support member main body 31 in the support member 330 extends in the vertical direction Z. The support member main body 31 in the support member 330 is disposed on the top side portion on the inside of the tank main body 11.

In the third embodiment, a plurality of trapping materials 340 are provided side by side in the vertical direction Z. The plurality of trapping materials 340 are disposed on the top side portion on the inside of the tank main body 11. Five trapping materials 340 are provided in the third embodiment. The five trapping materials 340 are disposed in a location that does not face the inflow opening 15*a*. Out of the plurality of trapping materials 340, a bottom end of the trapping material 340 located at the very bottom is located in the bottom direction more than the inflow opening 15*a* of the inflow pipe 15, and is located in the top direction more than the outflow opening 14*a* of the outflow pipe 14. Out of the plurality of trapping materials 340, the trapping material 340 located at the very top is located on the top end on the inside of the tank main body 11. With the exception of an aspect of disposition on the inside of the tank main body 11, the trapping material 340 is configured to be the same as the trapping material 40 of the first embodiment. Other configurations of various parts in the tank 310 are the same as the other configurations of the various parts in the tank 10 of the first embodiment.

As in the third embodiment, by disposing the trapping material 340 on the top end on the inside of the tank main body 11, passing the water W1 which has a relatively high temperature and that is being transported in the top direction in the tank main body 11 through the trapping material 340 becomes easier. Accordingly, having the scale attach to the trapping material 340 becomes easier.

Fourth Embodiment

Figure 9:
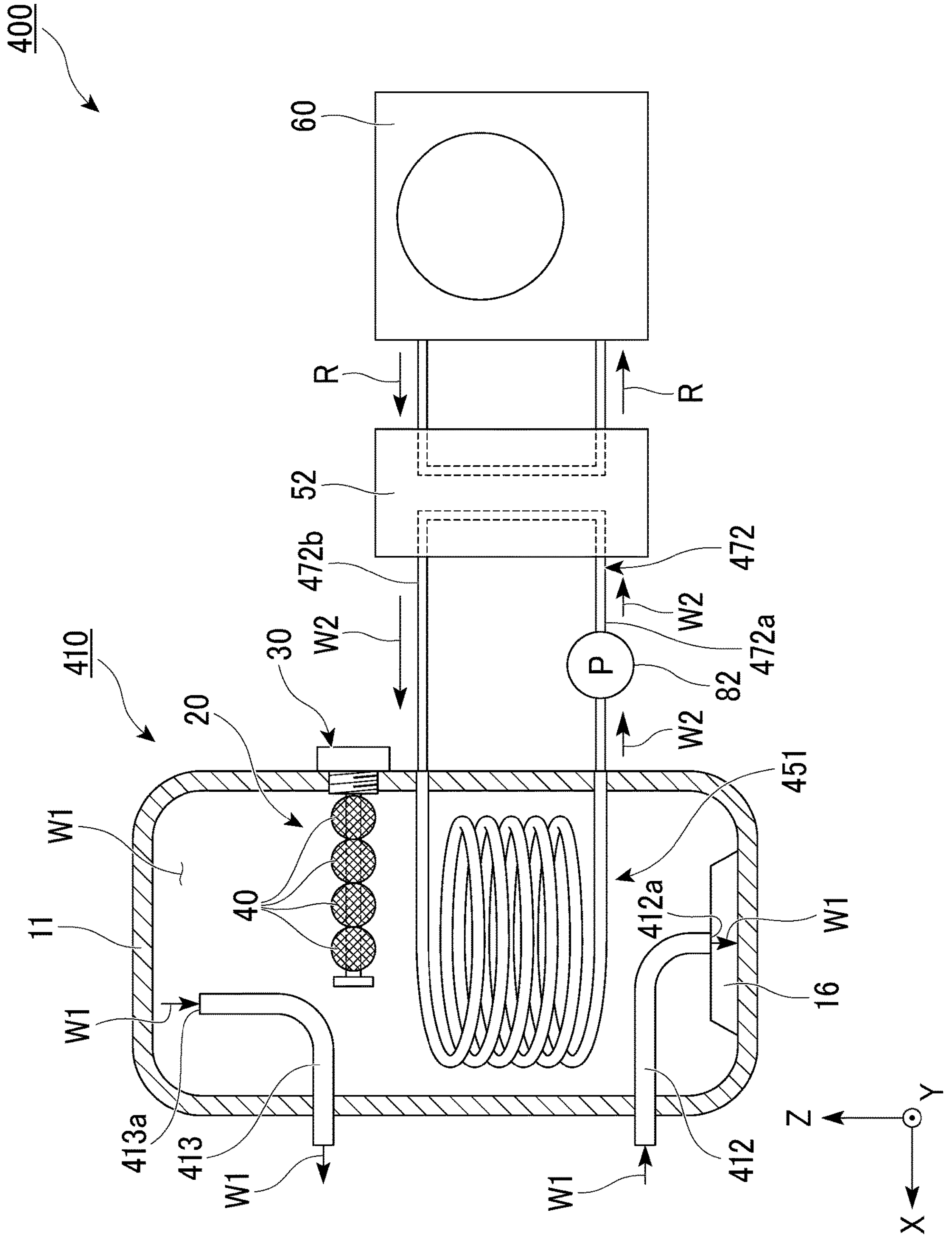
FIG. 9 A view that schematically shows a water heater in a fourth embodiment.

FIG. 9 is a view that schematically shows a water heater 400 in a fourth embodiment. In the explanations hereinafter, embodiments having the same configurations as the configurations previously mentioned have the same reference symbols affixed thereto, with explanations thereof omitted.

As shown in FIG. 9, a first heat exchanger 451 in the water heater 400 is disposed on the inside of the tank main body 11. The first heat exchanger 451 is a coil type heat exchanger configured by a pipe that extends in a spiral shape. The first heat exchanger 451 is made of metal. The first heat exchanger 451 is fixed to the tank main body 11. The water W2 flowing through an inside of a second flow path 472 flows on an inside of the first heat exchanger 451. With the exception of an aspect of having a part thereof be disposed on the inside of the tank main body 11 as the first heat exchanger 451, the second flow path 472 is the same as the second flow path 72 of the first embodiment. The first heat exchanger 451 is connected to the second heat exchanger 52 via pipes 472*a* and 472*b* that configure a part of the second flow path 472. In the fourth embodiment, the water W2 that flows on the inside of the second flow path 472 flows to the inside of the first heat exchanger 451 on the inside of the tank main body 11, after being heated by the refrigerant R in the second heat exchanger 52. By having the heat of the water W2 that flows on the inside of the first heat exchanger 451 be released onto the water W1 that is on the inside of the tank main body 11, the water W1 on the inside of the tank main body 11 is heated.

In a tank 410 of the fourth embodiment, the outflow pipe 14 and the inflow pipe 15 in the tank 10 of the first embodiment are not provided. In the fourth embodiment, a water supply pipe 412 corresponds to an "inflow pipe", and a hot water pipe 413 corresponds to an "outflow pipe". A water supply opening 412*a* of the water supply pipe 412 is an "inflow opening" that opens to the inside of the tank main body 11, and an intake opening 413*a* of the water heater pipe 413 corresponds to an "outflow opening" that opens to the inside of the tank main body 11. A configuration of the water supply pipe 412 is the same as the configuration of the water supply pipe 12 in the first embodiment. A configuration of the water heater pipe 413 is the same as the configuration of the water heater pipe 13 in the first embodiment.

With the exception of an aspect of the first heat exchanger 451 being fixed to the inside of the tank main body 11, instead of having the inflow pipe 15 and the outflow pipe 14 provided as in the first embodiment, a configuration of the tank 410 in the fourth embodiment is the same as the configuration of tank 10 of the first embodiment. In the fourth embodiment, the trapping unit 20 is disposed above the first heat exchanger 451. In other words, the support member 30 and the plurality of trapping materials 40 are disposed above the first heat exchanger 451. Other configurations of various parts of the water heater 400 are the same as the other configurations of the various parts of the water heater 100 of the first embodiment.

According to the fourth embodiment, since it is possible to trap the scale within the water W1 using the trapping material 40 as in the first embodiment, it is possible to suppress the scale from attaching to a surface of the first heat exchanger 451 that is disposed on the inside of the tank main body 11. Accordingly, it is possible to suppress a decrease in heat exchange efficiency between the water W2 that flows through the inside of the first heat exchanger 451 and the water W1 on the inside of the tank main body 11. The closer the trapping material 40 is disposed to the first heat exchanger 451, the more it is possible to increase the temperature of the water W1 that passes through the trapping material 40. As such, it is possible to appropriately trap the scale within the water W1 using the trapping material 40, and it is possible to appropriately prevent the scale from attaching to the surface of the first heat exchanger 451.

In the fourth embodiment, a coil type first heat exchanger 451 may be disposed on the outside of the tank main body 11. In the fourth embodiment, instead of providing the support member 30, the trapping member 40 may be attached to the coil type first heat exchanger 451.

Fifth Embodiment

Figure 10:
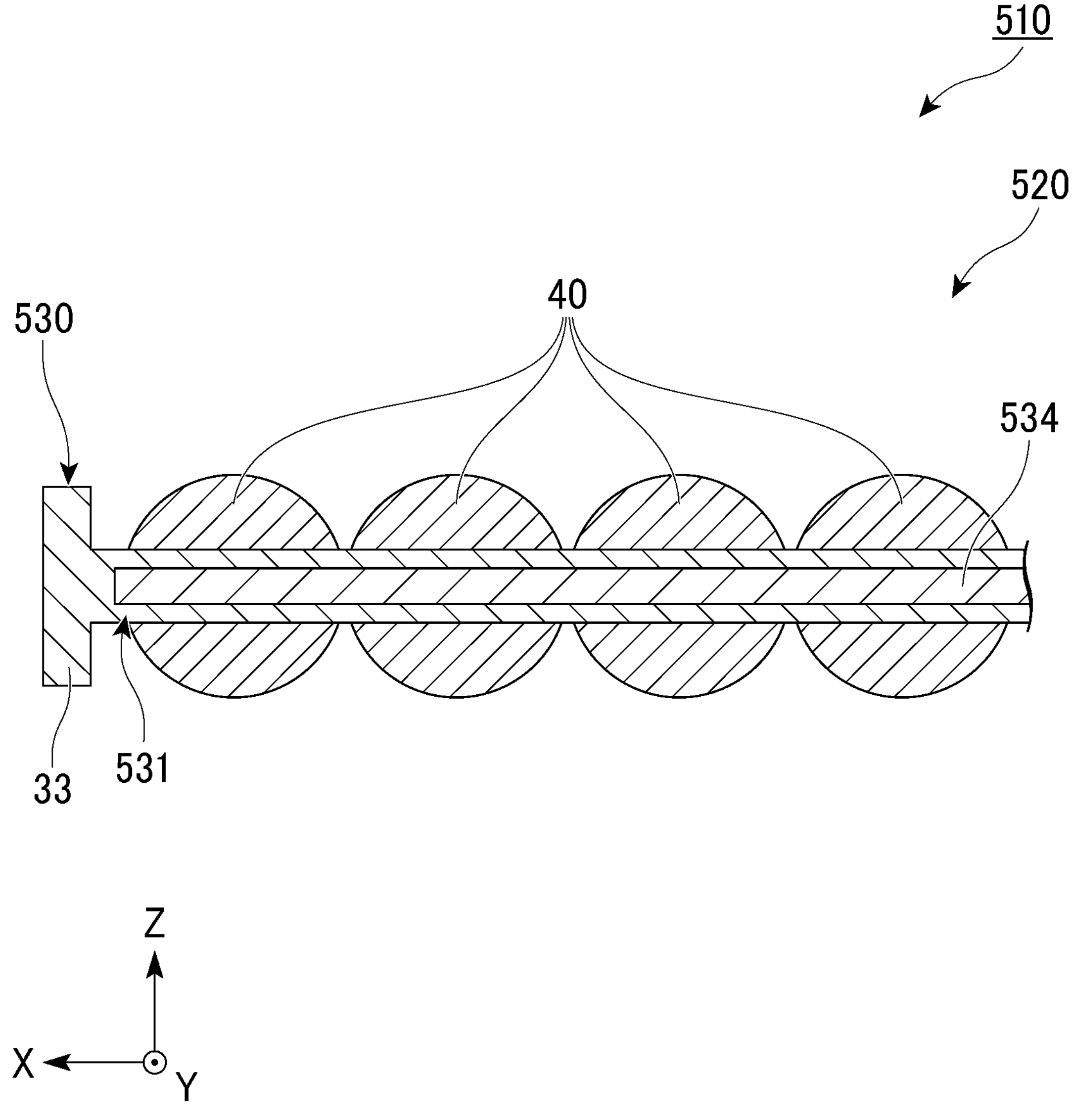
FIG. 10 A cross-section that shows a part of a trapping unit of a tank in a fifth embodiment.

FIG. 10 is a cross-section that shows a part of a trapping unit 520 of a tank 510 in a fifth embodiment. In the explanations hereinafter, embodiments having the same configurations as the configurations previously mentioned have the same reference symbols affixed thereto, with explanations thereof omitted.

As shown in FIG. 10, an inside of a support member main body 531 in the fifth embodiment is hollow. A support member 530 in the fifth embodiment has a heater 534. The heater 534 is a rod shape that extends in the first horizontal direction X. The heater 534 is inserted inside of the hollow support member main body 531. The heater 534 for example, is an electric heater that heats using current. Heat of the heater 534 is released to the water W1 on the inside of the tank main body 11 via the support member main body 531. By making the material which configures the support member main body 531 to be a highly thermal conductive material, it is possible to appropriately release the heat that is generated in the heater 534 to the water W1 on the inside of the tank main body 11 via the support member main body 531. Other configurations of various parts in the tank 510 are the same as the other configurations of the various parts in the tank 10 of the first embodiment.

According to the fifth embodiment, the support member 530 has the heater 534. As such, it is possible to heat the water W1 on the inside of the tank main body 11 using the heat that is generated at the heater 534. Accordingly, even in a case where for example, environmental factors or the like cause the heat exchanging performance of the first heat exchanger 51 or the like disposed on the outside of the tank main body 11 to be insufficient, it is still possible to appropriately raise the temperature of the water W1 on the inside of the tank main body 11. By having the support member 530 that supports the trapping material 40 have a function of heating the water W1, there is no need to provide a separate heater device for heating the water W1 other than the support member 530. As such, it is possible to eliminate a cost of providing the separate heater device. It is also possible to suppress having a space on the inside of the tank main body 11 from becoming smaller due to the need to provide the separate heating device. It is possible to appropriately raise the temperature of the water W1 that is located in the surroundings of the support member main body 531 by the heat of the heater 534. As such, it is possible to appropriately raise the temperature of the water W1 that flows through the trapping material 40, making it easier for more scale to precipitate on the surface of the trapping material 40.

In the fifth embodiment, the heater 534 may for example, be a flow path in which a heated liquid such as water or the like flow through. The heater 534 may be the support member main body 531. In such case, for example, a conducting wire is connected to the fixing portion 32, and the support member main body 531 heats up by current flowing to the support member main body 531. One configuration may be where a plurality of heaters 534 are fixed to several locations in the tank main body 11.

Although embodiments of the present disclosure have been explained above, the various embodiments and configurations are not limited to the explanations above, and it is possible to adopt the configurations and methods below.

An application of a tank is not limited in any way. The tank may be a tank that is provided for a device other than a water heater. A liquid that is stored within the tank is not limited to water, and may be any other liquid. A shape of a tank main body may be any shape. The tank main body may be disposed along a center axis that extends in the horizontal direction orthogonal to the vertical direction. In other words, the tank in the previously mentioned various embodiments may be disposed so as to collapse horizontally.

Inflow pipes of the tank may be inflow pipes that have an inflow opening which opens to an inside of the tank main body, may be of any shape, and may be in any disposition on the inside of the tank main body. Outflow pipes of the tank may be outflow pipes that have an outflow opening which opens to the inside of the tank main body, may be of any shape, and may be in any disposition on the inside of the tank main body. A heat exchanging device connected to the tank may be any type of heat exchanging device.

A shape of a trapping material, a number of the trapping material, and a material that configures the trapping material is not limited in any way. The more number of trapping materials there are, the more it is possible to suppress scale from attaching to trapping materials other than the trapping material of the water heater. The number of the trapping materials may for example, be decided based on a service life of the tank. Dispositions of a plurality of trapping materials is not limited in any way. A plurality of trapping materials may be disposed around one trapping material so as to surround the one trapping material. The plurality of trapping materials may be disposed on top of a base of the tank main body. The trapping material may be of any configuration. The trapping material may for example, be configured of a plurality of small thin tubular members, and a bag that accommodates the plurality of small thin tubular members, the bag having a mesh shape. When gaps are provided in the trapping material, a gap ratio ε [%] of the trapping material is not limited in any way.

A support member main body may be of any shape. The support member main body may be a bent shape that extends, and may be a shape that splits to two or three branches. A support member may be fixed to the tank main body in any way. The shape of the support member is not limited in any way. Fixing of the support member to a through hole may be a method other than press-fitting or the like using threads, and may be permanent. The support member may be fixed to the tank main body using a securing bracket, and may be fixed to the tank main body with sealing performance insured via a joint having a gasket that is compressed. The support member may be supported at two ends in the tank main body.

The various configuration and various methods explained in the above specification may be combined as needed so long as no conflicts therebetween with the technical scope thereof occur.

The invention claimed is:

1. A tank comprises:

a tank main body that is disposed along a longitudinal center axis, and that stores a liquid on an inside thereof;

an inflow pipe having an inflow opening that opens to the inside of the tank main body;

an outflow pipe having an outflow opening that opens to the inside of the tank main body, and a trapping material that is located on the inside of the tank main body, and a plurality of trapping materials that includes the trapping material are disposed side by side in one direction, and a support member that is fixed to the tank main body, wherein the support member has a support member main body that is disposed on the inside of the tank main body, the plurality of trapping materials are separately disposed from the inflow opening and the outflow opening, and are provided on a part of the inside of the tank main body in a cross-section that includes the trapping material so as to be orthogonal to an axial direction of the longitudinal center axis, the plurality of trapping materials are attached to the support member main body, and the support member main body extends in said one direction, and penetrates the plurality of trapping materials.

2. The tank according to claim 1, wherein the trapping material includes a first trapping material, and the first trapping material is disposed so as to face the inflow opening with a space therebetween.

3. The tank according to claim 2, wherein the inflow opening opens to a bottom in a vertical direction, and the first trapping material is located below the inflow opening in the vertical direction.

4. The tank according to claim 2, wherein the space between the first trapping material and the inflow opening is larger than an inner diameter of the inflow opening.

5. The tank according to claim 2, wherein the first trapping material is spherically shaped, and an outer diameter of the first trapping material is larger than an inner diameter of the inflow opening.

6. The tank according to claim 2 wherein:

the trapping material includes a second trapping material, and the second trapping material is disposed beside the first trapping material, and is in contact with the first trapping material.

7. The tank according to claim 1, wherein the tank main body has a through hole that penetrates a wall of the tank main body, and the support member main body is inserted from an outside of the tank main body, through the tank main body, and into an inside of the tank main body via the through hole.

8. The tank according to claim 7, wherein the support member has a fixing portion that is detachably fixed to the through hole.

9. The tank according to claim 1, wherein the support member has a heater.

10. The tank according to claim 1, wherein the trapping material is made of a metal.

11. The tank according to claim 10, wherein the trapping material is configured of a plurality of metallic fibers that extends in a spiral shape and are intertwined with one another.

12. A water heater comprises:

the tank according to claim 1;

a heat exchanger connected to the tank, and an outdoor unit that is connected to the heat exchanger.

* * * * *